Figure 1:
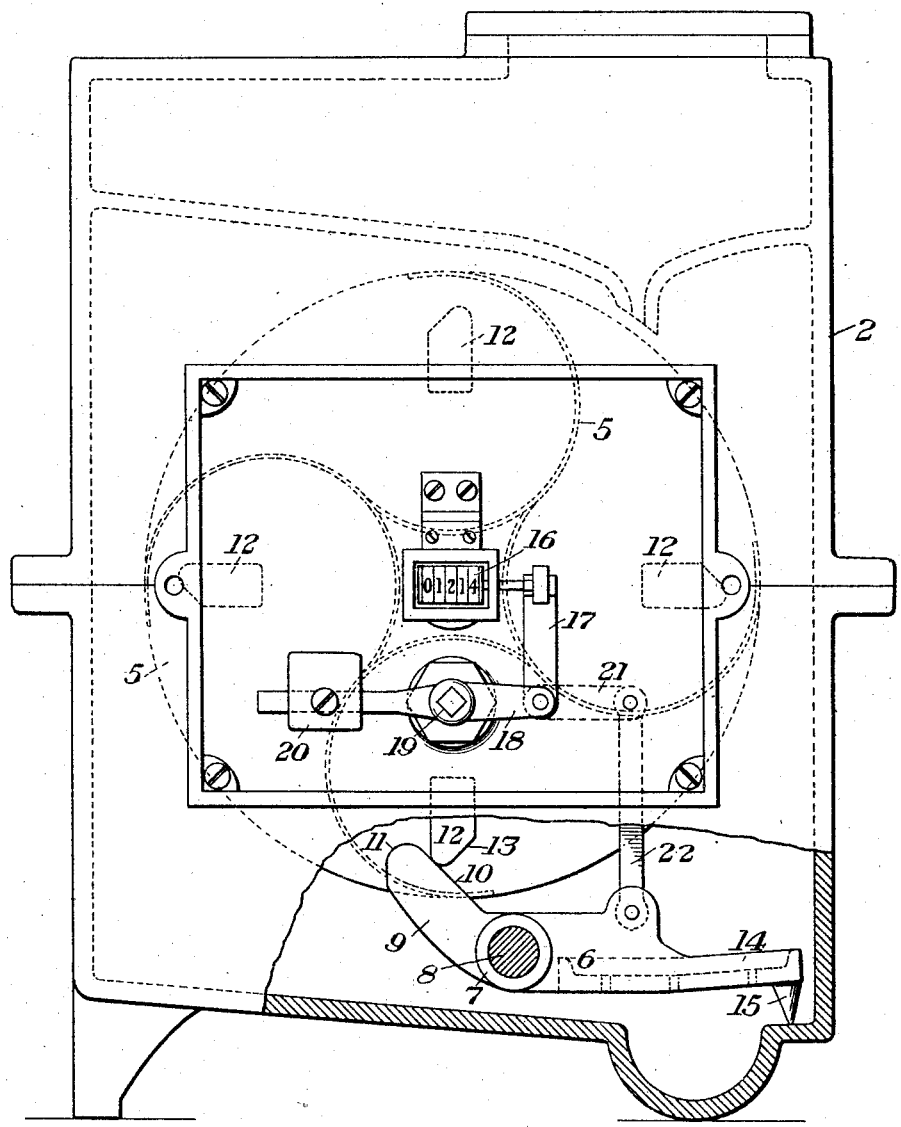

W. I. STAAF.
LIQUID METER.
APPLICATION FILED MAR. 12, 1915.

1,188,215.

Patented June 20, 1916.
2 SHEETS—SHEET 1.

W. I. STAAF.
LIQUID METER.
APPLICATION FILED MAR. 12, 1915.
1,188,215.
Patented June 20, 1916.
2 SHEETS—SHEET 2.
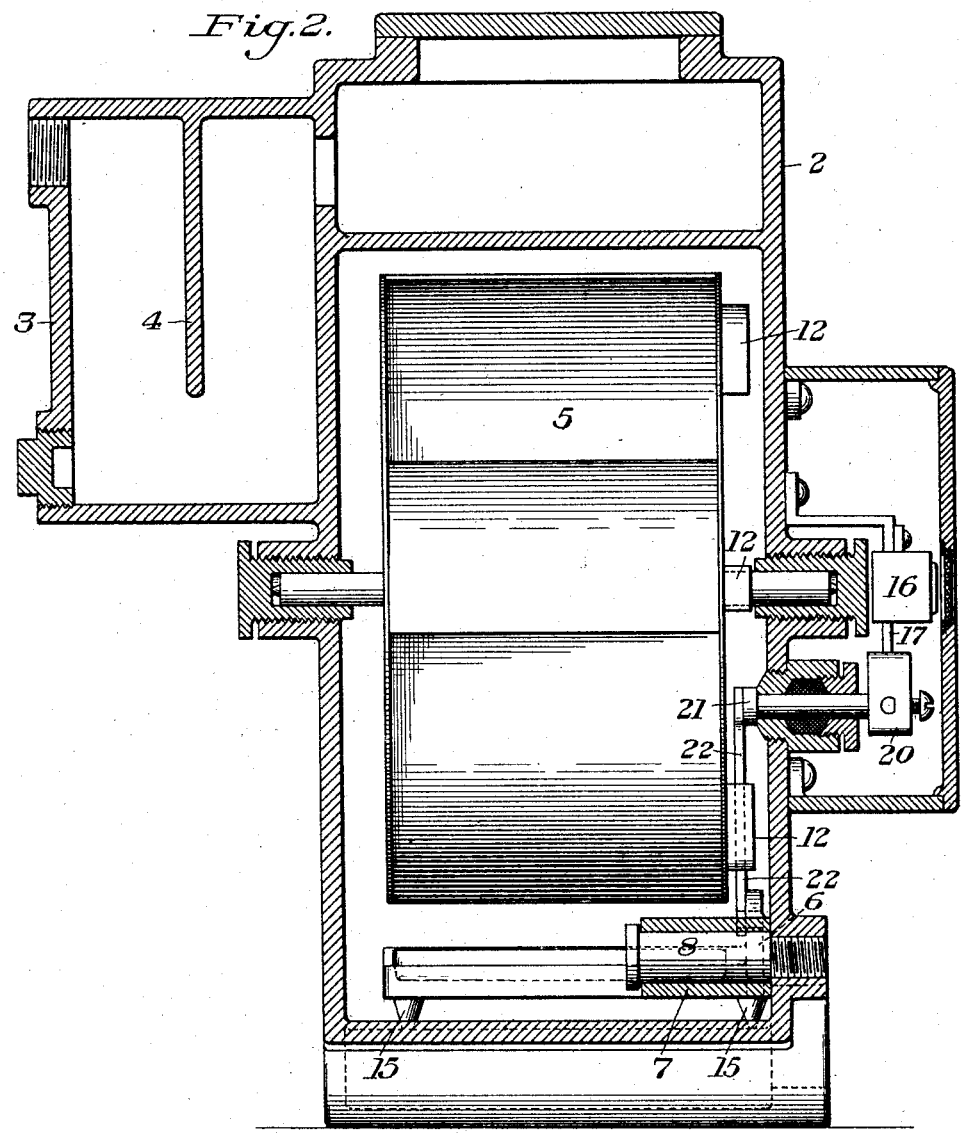
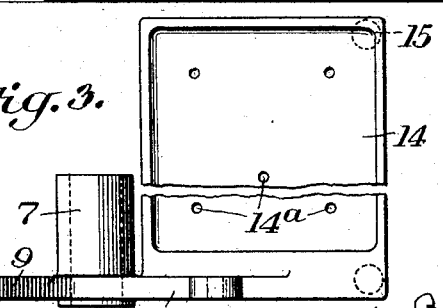
WITNESSES
INVENTOR

UNITED STATES PATENT OFFICE.

WERNER I. STAAF, OF PITTSBURGH, PENNSYLVANIA, ASSIGNOR OF ONE-HALF TO EDWARD B. TYLER, OF PITTSBURGH, PENNSYLVANIA.

LIQUID-METER.

1,188,215.  Specification of Letters Patent.  Patented June 20, 1916.

Application filed March 12, 1915. Serial No. 13,926.

*To all whom it may concern:*

Be it known that I, WERNER I. STAAF, a citizen of the United States, residing at Pittsburgh, Allegheny county, Pennsylvania, have invented a new and useful Improvement in Liquid-Meters, of which the following is a full, clear, and exact description, reference being had to the accompanying drawings, forming part of this specification, in which—

Figure 1 is an elevation partly broken away of a liquid meter, embodying my invention; Fig. 2 is a vertical section of the meter; and Fig. 3 is a detail plan view of a locking member.

My invention has relation to improvements in liquid meters, and is particularly adapted for use in connection with meters of the general type described and claimed in the patent to myself and Edward B. Tyler, No. 1,092,082, dated March 31, 1914, although it may be used in connection with other forms of rotary bucket meters.

The present invention has more particular relation to the locking or escapement device, by means of which the measuring wheel is stopped in the proper position after each discharge.

The object of the invention is to provide a device of this character, which will be simple and positive in its action, and by means of which the measuring wheel after each discharge can be held in proper position while a bucket is filling and which will automatically release at the proper time to permit the proper discharge of the bucket.

In the accompanying drawings, the numeral 2 designates the casing of the meter having a laterally offset inlet chamber 3, formed with a baffle 4.

5 designates the measuring wheel journaled in the main chamber of the casing and which is, in general, of the construction shown and described in the said Patent No. 1,092,082, to which reference may be had.

6 designates a lever member having a sleeve portion 7, which is journaled on a pivot 8 at the lower portion of the casing. This lever member has an upwardly projecting stop arm 9, formed with an inclined surface 10 and rounded end 11, and is adapted for engagement with any one of a number of stop projections 12, carried by the measuring wheel, there being one of these projections for each bucket on the wheel.

The projections are arranged at one end of the wheel, as best shown in Fig. 2, and each of them has a beveled end portion 13. The other arm of the lever member 6 carries the laterally projecting weighted portion 14, which is preferably provided with a pan or recessed portion having openings 14$^a$ through the bottom thereof. This pan will be in a position to receive on its upper surface a considerable amount of the water or other liquid discharged from the buckets of the meter. Said lever member also carries stop projections 15, which, by contact with the bottom wall of the casing 2, limit the upward movement of the stop arm 9.

The numeral 16 designates a register or indicator, such as shown in the patent above referred to, and which counts the operations of the measuring wheel. This registering apparatus is actuated by a connection 17 with a lever 18, pivoted at 19, counterweighted at 20, and having connections 21 and 22 with the lever member 6. These connections are such that at each operation of the lever member 6, the registering wheels will be properly operated to register the discharge of the bucket.

The operation will be readily understood. Normally, the measuring wheel will be held in a position, such as shown in Fig. 1, while one of its buckets is being filled, by reason of the engagement with one of the stop projections 12, of the stop arm 9 of the lever member 6. When the weight of the liquid in a bucket overcomes the counter-weight action of the lever 6, the measuring wheel begins to rotate, the beveled end 13 of the stop projection 12 riding up the inclined surface 10 of the stop arm 9, and passing the rounded end 11 of said arm. This permits the bucket to discharge its contents and to bring a new bucket into a position to be filled. The action of the falling liquid upon the counterweight portion 14 of the lever member 6 assists this counterweight portion in returning said lever member to its normal stopped position, and effectively prevents a false operation of the wheel, by reason of its momentum. The water within the pan or recess will pass out through openings 14$^a$ before the next bucket is filled.

By properly adjusting the counterweight 20, to thereby oppose to a greater or less extent the action of the counterweight portion 14, the measuring wheel may be set to operate with different predetermined weights of liquid in the buckets.

I do not desire to limit myself to the particular construction and arrangement of parts as herein shown and described, since, as above stated, my invention is applicable to other forms of bucket-measuring wheels. The details of the stop mechanism may also be changed, without departing from the spirit and scope of my invention as defined in the appended claims.

I claim:

1. In a liquid meter, the combination with a rotary measuring wheel having a series of buckets, of a weighted lever member mounted below said wheel, said lever member and wheel having coöperating stop and escapement means, and the lever having a counterweighted portion in position to receive a portion of the discharge from the buckets, substantially as described.

2. In a liquid meter, the combination with a rotary measuring wheel having a series of buckets and a stop projection for each bucket, of a weighted lever member having an arm normally projecting into the path of movement of said stop projections, said arm and projections having coöperating surfaces permitting the projections to pass the arm under predetermined conditions, the weighted portion of said lever being in position to be impinged by the discharge from the buckets, substantially as described.

3. In a liquid meter, the combination with a rotary measuring wheel having a series of buckets, of a weighted lever member mounted below said wheel, said lever member and wheel having coöperating stop and engagement means, and said lever having a recess portion in position to receive a portion of the liquid discharged from the buckets, together with means for permitting said liquid to pass out of said recess at a predetermined rate in a predetermined time, substantially as described.

In testimony whereof, I have hereunto set my hand.

WERNER I. STAAF.

Witnesses:
 Geo. B. Bleming,
 R. A. Balderson.